Patented Nov. 17, 1953

2,659,676

UNITED STATES PATENT OFFICE 2,659,676

INFANT FOOD

Hartley W. Howard, Hastings on Hudson, N. Y., and Julius F. Muller, Princeton, N. J., assignors to The Borden Company, a corporation of New Jersey No Drawing. Application April 10, 1951,
Serial No. 220,364

3 Claims. (Cl. 99—56)

This invention relates to an infant food and the method of making it. It relates particularly to an infant food powder in which the fat component is so compounded that, although considerably higher in unsaturation than the fats in cow's milk, this fat component is less subject to oxidation than butter fat; the several ingredients of varying susceptibility to oxidation are so distributed in the finished powder that those most subject to oxidation are protected to a substantial extent by an outer film of material less subject to deterioration by oxidation; and palm oil constitutes approximately half at least of the total fat present.

Food for babies and young infants has been the subject of extensive researches by physicians, chemists and other earnest workers for a great many years. The foods so developed and marketed have required variation with the age of the infant. The necessary variation has included change in the ratio of the ingredients of the food to each other as well as of the total amount of food supplied per day. In a representative modification of cow's milk involving added water and sugar, for instance, the ratio of each one of these three ingredients to each is varied according to the age of the infant five times in nine months (see Infant Care, Children's Bureau Publication, No. 8, U. S. Department of Labor, 1945).

Our new food requires no variation of the proportions of the ingredients to each other during the entire time of the feeding schedule, up to nine months or longer.

Reported tests include results for a group of 171 new born infants; with the feeding of our material from the first, the birth weight was regained in most instances before the sixth day. For thirty-nine infants were fed up to six months of age on this formula, without any variation in the proportion of the ingredients to each other during the entire period, complete blood counts, X-rays, and weight and growth charts showed our food to be excellent in all respects and to give unusually good results.

Briefly stated, our invention comprises infant food containing lactose, fats and proteins, the lactose being present in larger proportion than the fats and the fats in larger proportion than the proteins, and palm oil constituting at least approximately half of the total fats. In the preferred embodiment, the invention comprises also added lecithin, a source of methionine in combination with a protein component including 5-6 parts of casein to 1 of lactalbumin, and minerals and vitamins in physiologic proportions.

A formula on the completely dry basis for our infant food that gives the advantages recited herein is shown in the following table. In this table and elsewhere herein the proportions are expressed as parts by weight unless otherwise specifically stated.

Formula

| Ingredient | Percent in Food |
| --- | --- |
| Skim milk (condensed to 21 to 26.5% solids), dry wt. | 33.2 |
| Lactose added as such | 38.4 |
| Palm oil | 13.2 |
| Coconut oil | 6.6 |
| Peanut oil | 6.6 |
| Lecithin | 1.0 |
| Calcium chloride | 0.55 |
| Potassium hydroxide | 0.22 |
| Methionine | 0.15 |
| Ferrous sulfate | 0.03 |
| Ascorbic acid | 0.04 |
| Niacin | 0.005 |
| Thiamine hydrochloride | 0.0003 |
| Riboflavin | 0.0002 |
| Vitamins A and D oil concentrate | 0.0045 |
| | 100.0000 |

Computing together all of the ultimate ingredients of the same kind in the composition of the table referred to shows that the proportion of minerals, vitamins, and methionine source are high as compared to usual infant foods. When our formula is made up with 88 parts of water for 12 parts by weight of the powder containing originally 2.3% water, that is, to a concentration suitable for feeding to infants, the 12% solution will contain about the following proportions of methionine and minerals, the minerals being calculated as the elements.

| Ingredient | Percent of the 12% Solution |
| --- | --- |
| Methionine (including cystine) | 0.08 |
| Calcium | 0.08 |
| Phosphorus | 0.05 |
| Potassium | 0.08 |
| Iron | 0.0008 |
| Total minerals (ash) | 0.4 |

Sources of vitamins suitably are added in such proportions that the food will contain the following amounts of vitamins for 100 grams of the 12% solution:

Vitamins per 100 g. of 12% solution

| | |
| --- | --- |
| Vitamin A, int. units | 330 |
| Vitamin D, U. S. P. units | 82 |
| Thiamine, micrograms | 41 |
| Riboflavin, micrograms | 103 |
| Vitamin C, micrograms | 3000 |
| Niacin | 620 |

In the formulas above, various ingredients serve special purposes.

The methionine increases the biological value or utilization of casein and lactalbumin in the proportions used in the metabolism of the infant, the ratio of these proteins in the skim milk being about 5-6 parts casein to 1 of lactalbumin.

The lecithin promotes fine dispersion of the fat component (oil component). This fine dispersion combined with the homogenizing and spray drying result in the substantial concentration of the fats inside the particles of the spray dried powder, with an outer covering consisting largely of milk protein, lactose and other water soluble material.

The iodine number of our preferred fat mixture containing approximately 2 parts palm oil to 1 part each of coconut and peanut oils is 54.5. Although this number is much higher than that for fats of cow's milk (30.0), our fat mixture actually oxidizes less rapidly than the cow's milk fat under comparable circumstances.

In testing this oxidation rate, the following technique is used: 5 g. samples of the oil to be tested are absorbed in strips of filter paper of standard size and then maintained at 50° C. in contact with air. Strips are removed at intervals, the oil dissolved out with a mixture of 60 parts of glacial acetic acid and 40 of chloroform and the extract mixed with an excess of standard potassium iodide solution. The iodine liberated is then titrated with standard thiosulfate. This measures the oxidation ("peroxide value") produced in the oil by the exposure to air at 50° C. Results follow—

| Hours Exposure to Air at 50° C. | Peroxide Value (mill; equivalents for 1,000 g. fat) | |
|---|---|---|
| | Butter Fat | Our Mixed Fats |
| 0 | 6 | 18. |
| 72 | 40 | 17. |
| 142-144 | 173 (142 hrs.) | 19 (141 hrs.). |
| 242 | 366 | 20. |
| 1,562 | no test | 40. |

As to the kinds of materials, reasonable variations may be made. All materials used, however, must be edible in the proportions employed.

In place of part of the lactose, there may be substituted a limited proportion of other sugar such as sucrose, maltose, or dextrose, but lactose is the best for the purpose and is used preferably without any substitution.

As to the oils, we find it important that the proportion of palm oil to the other fats be about as stated. Other common fats may be substituted for those fats shown if proportions of individual fatty acids represented in the final mixture are about the same as the totals for the several acids in our preferred composition including approximately 2 parts of palm oil to 1 part each of coconut and peanut oils.

As to the minerals, iron and the like, these may be added in any convenient form and suitably in the form of chloride, sulfate, lactate or acetate, the particular radical selected for use with the metal to be added being one which gives a soluble salt with that metal.

The methionine may be added in the form of a source rich in methionine, such as emulsifiable protein, peptose or peptide of high methionine content. Cystine, like methionine a sulfur-containing aminoacid, is equivalent to the methionine for the present purpose. Cystine may be used in place of methionine and in the same proportion. Methionine is preferred, however, because of its greater solubility. The methionine or an equivalent is added in amount to make the total sulfur-containing aminoacid content of the food about 0.6 part for 100 parts of the food on the dry basis.

As to proportions, the several materials are used to advantage in the amounts required to provide the percentages of the several ingredients shown in the tables above. These proportions give outstanding results. If for reasons of economical advantage or for special purposes, it is desired to vary the various ingredients, it is to be noted that, for best results, we keep the proportions of the major ingredients approximately as shown and within a third above or below the proportions stated. There is no advantage in large variation of the proportions that offsets the disadvantage of attendant imbalance of the ingredients of the food. Minor ingredients such as minerals and vitamins may be varied somewhat more.

As to the method of manufacture, we prefer to use a somewhat concentrated milk such as condensed skim milk as the base. This is adjusted to pH approximately 6.7 before calcium chloride or the like is admixed, to supply the desired calcium. It is adjusted also to approximately pH 6.7 after the addition of the calcium chloride. The alkali used for the adjustment is preferably potassium hydroxide added in dilute aqueous solution and in the amount if any required to establish the pH at about 6.7 level both before and after adding the calcium chloride.

The fats are added to advantage in a mixture with lecithin. Such a mixture homogenizes readily in the subsequent homogenization and facilitates the desired distribution of components in the finished product.

The various other materials with the exception of vitamin C are added in any convenient form and the whole is pasteurized and homogenized. Into the pasteurized and homogenized mixture there is then introduced the vitamin C. This dissolves in the aqueous or continuous phase of the homogenized mixture which contains principally a solution of lactose along with other water soluble materials. The whole is then delivered at once to the spray drier. As a result there is only a very short period of contact between the vitamin C and the other materials in wet condition. In the spray drying that ensues, the water is evaporated and the vitamin C is left in substantially dry condition and the association with a relatively enormous proportion of lactose, a mild antioxidant.

In the resulting spray dried material, the fats and lecithin component along with other fat soluble materials are more concentrated in the interior parts of the resulting particles of powder than on the outer proportions of those particles. Lactose and other water soluble ingredients, on the other hand, occur in greater concentration in the exterior of the particles than in the interior thereof and provide a protecting film of substantial antioxidant properties over the fats and fat-soluble materials, so as to restrict the access of air to them.

The invention will be further illustrated by description in connection with the following specific example of the practice of it.

*Example*

The several materials are added in the proportions required to make the total percentages of them as shown in the formula above.

1. Condensed skim milk is weighed and charged to a mixing kettle. The lactose is then dissolved in the milk.

2. The pH is adjusted to 6.7 at this point by stirring in the necessary amount if any of potassium hydroxide in a 4% aqueous solution. At this pH, premature separations are avoided in the homogenized mix described later in this example.

3. Calcium chloride is dissolved in water and added to the mix.

4. The pH is adjusted to 6.6–6.7 with 4% KOH.

5. Ferrous sulphate is dissolved in water and added to the mix.

6. The milk is heated to 140° F.

7. The oil mixture, containing lecithin, is made up in the stainless steel pasteurizer and conditioned by holding the mixture at 145° F. for 30 minutes before the first portion is used in the mix. A small portion of the oil-lecithin is reserved and used to dilute the vitamins A and D oil concentrate and to facilitate the addition of these vitamins to the mix.

8. Vitamins A and D are added to the mix in the oil composition made as stated.

9. The mix is pasteurized at 165° F. for 15 minutes.

10. After 10 minutes of this pasteurizing period, premixed methionine, thiamine, niacin and riboflavin are added.

11. The mix is then pumped to the stainless steel homogenizer surge tank.

12. The mix is homogenized at 2000 lbs. pressure (1000 lbs. on each valve).

13. The homogenizer discharges the product into an enclosed clarifier. The homogenization gives an emulsion with fats and fat solubles in the dispersed phase. The clarified mix passes into an insulated stainless steel storage tank.

14. By means of a centrifugal pump, the mix is pumped from the storage tank through a heat exchanger so as to obtain a final temperature of 185° F.

15. The heater discharges directly to a high pressure pump. Immediately ahead of the high pressure pump the ascorbic acid, dissolved in water, is introduced into the line at a rate proportioned to the rate of feed of the mix to the drier. This introduces the ascorbic acid (vitamin C) into the aqueous phase.

16. The mix is then spray dried.

17. The dry powder is passed through a sifter with 16 mesh screen and packed for use.

It will be understood that all equipment used in the procedure of this example is conventional and therefore is not illustrated.

It will be understood also that it is intended to cover all changes and modifications of the examples of the invention herein chosen for the purpose of illustration which do not constitute departures from the spirit and scope of the invention.

What we claim is:

1. An infant food comprising lactose, edible fats, and edible proteins, the lactose being present in larger proportion than the fats and the fats in larger proportion than the proteins, the fats containing not less than about 50 per cent of palm oil on the total weight of the fats, having an iodine number greater than that of cow's milk fat, but being oxidized when exposed to air at a lower rate than cow's milk fat under the same conditions of exposure.

2. The infant food of claim 1 in which the fats consist essentially of palm, coconut, and peanut oils approximately in the proportions of 2, 1, and 1 parts, respectively, by weight.

3. The infant food of claim 2 including lactalbumin and casein in the said protein in the proportion of about 1 part of the former to 5–6 of the latter, an added source of methionine in amount to make the total proportion of sulfur-containing amino acids approximately 0.6% of the food, and added lecithin, minerals and vitamins, the proportion of lecithin being about 1 for 100 parts of the food and said minerals containing the following elements in approximately the proportions shown for 100 parts of the food: calcium 0.6, phosphorus 0.4, potassium 0.6, and iron 0.006, all proportions being by weight and on the dry basis.

HARTLEY W. HOWARD.
JULIUS F. MULLER.

References Cited in the file of this patent

UNITED STATES PATENTS

| Number | Name | Date |
|---|---|---|
| 1,216,052 | Beckman et al. | Feb. 13, 1917 |
| 1,302,486 | Dunham | Apr. 29, 1919 |
| 2,335,275 | Hauser et al. | Nov. 30, 1943 |

OTHER REFERENCES

Whitmore, F. C.: "Organic Chemistry," third printing, August 1938; pub. by D. Van Nostrand Co., Inc., N. Y. C.; page 600.

Hunziker, O. F.: "Condensed Milk and Milk Powder"; pub. 1946 by the author, La Grange, Illinois, 6th edition; pages 1, 493.

Bailey, A. E.: "Cottonseed and Cottonseed Products"; pub. 1948 by Interscience Publishers Inc., N. Y. C.; pages 425, 489, 773.